(12) United States Patent
Atieh et al.

(10) Patent No.: US 7,490,998 B2
(45) Date of Patent: Feb. 17, 2009

(54) OPTICAL COMPONENT PACKAGE

(75) Inventors: Ahmad Atieh, Ottawa (CA); John Mills, Ottawa (CA)

(73) Assignee: BTI Photonic Systems Inc., Ottawa, Ontario (CA)

( * ) Notice: Subject to any disclaimer, the term of this patent is extended or adjusted under 35 U.S.C. 154(b) by 0 days.

(21) Appl. No.: 11/484,761

(22) Filed: Jul. 12, 2006

(65) Prior Publication Data

US 2008/0013897 A1   Jan. 17, 2008

(51) Int. Cl.
*G02B 6/38* (2006.01)
*G02B 6/36* (2006.01)

(52) U.S. Cl. ............................. 385/89; 385/55; 385/56; 385/88; 385/92

(58) Field of Classification Search ............... 385/88–89
See application file for complete search history.

(56) References Cited

U.S. PATENT DOCUMENTS

| | | | |
|---|---|---|---|
| 6,257,770 B1 * | 7/2001 | Sato .............................. | 385/78 |
| 6,715,930 B2 * | 4/2004 | McBride ....................... | 385/73 |
| 7,171,081 B1 * | 1/2007 | Ko et al. ........................ | 385/39 |
| 2004/0013368 A1 * | 1/2004 | Gilliland et al. ............... | 385/53 |
| 2005/0018967 A1 * | 1/2005 | Huang et al. .................. | 385/39 |
| 2006/0088254 A1 * | 4/2006 | Mohammed .................. | 385/92 |

* cited by examiner

*Primary Examiner*—Hemang Sanghavi
*Assistant Examiner*—Kajli Prince

(57) ABSTRACT

An optical component package is disclosed. The package has a housing. The interior of the housing is adapted to house an optical component. The package includes at least two fiber optic connectors, each comprising an component side adapted to connect to the optical component and each having a pluggable exterior element. Each of the at least two fiber optic connectors are mounted in the housing with their component side accessible from the interior of the package and their pluggable exterior element accessible from the exterior.

16 Claims, 6 Drawing Sheets

US 7,490,998 B2

OPTICAL COMPONENT PACKAGE

FIELD OF THE INVENTION

This application relates to the packaging of optical components, and more particularly to the packaging of miniature optical components.

BACKGROUND OF THE INVENTION

Optical components are often mounted on a printed circuit board with other components and into a module housing to form a module. The module is then inserted into a slot in a module card rack. The forward face of the module contains a female optical socket connected to the optical component internal to the module. An optical cable, having a male optical connector at both ends, is used to connect the optical component in the module to an optical component in another module or to/from an optical input/output. One end of the optical cable is plugged into the female optical socket and another end of the optical cable is plugged into the device to which it is to be connected.

There are disadvantages to this set-up. First, the routing and positioning of the optical cable must be managed. Cable management in a large system is not trivial. Second, the module occupies a position in the module card rack which could otherwise be used for another module. Third, the optical component can not easily be replaced in the system since it is mounted to a printed circuit board.

Additionally, the flexibility of the system is limited by the configuration of the available modules. For example, in dense wavelength division multiplexing (DWDM) systems, the modules on the market have a predetermined number of channels which limits the flexibility to provide only a specific number of channels. Also, when there is a need to perform common signal conditioning for all channels at once (e.g. dispersion compensation) or use more optical components to perform the conditioning on a single channel in a multi-channel system (e.g. use a demultiplexer and a single channel dispersion compensator), the modules lack flexibility to easily do so.

SUMMARY OF THE INVENTION

An embodiment of the invention provides an optical component package. The package consists of a housing into which an optical component may be mounted. At least two optical connectors, which may be plugged into from the exterior of the package, are fixed to the package. The optical connectors are internally connectable to the optical component. The optical component package is pluggable in that it need not be permanently connected to another system component but may simply be plugged in and removed. The connectors can also enable the optical package to be self-supporting when connected.

An aspect of the invention provides an optical component package comprising: a housing having an interior and an exterior the interior being adapted to house an optical component; at least two fiber optic connectors, each comprising a component side adapted to connect to the optical component and each having a pluggable exterior element; each of the at least two fiber optic connectors being mounted to the housing with the respective component side accessible from the interior of the package and the respective pluggable exterior element accessible from the exterior.

In some embodiments, the at least two optical connectors are fixed to the housing such that the connectors support the package when the package is plugged in.

In some embodiments, the at least two optical connectors are fixed to the housing by an adhesive.

In some embodiments, the at least two optical connectors are fixed to the housing by the shape of the housing.

In some embodiments, the at least two optical connectors comprise at least one pair of optical connectors and wherein the pair of optical connectors are mounted in linearly opposite directions.

In some embodiments, the pair of connectors are linearly aligned.

In some embodiments, the at least two optical connectors comprise at least one female connector and at least one male connector.

In some embodiments, the at least one female connector and the at least one male connector comprise the same type of connector.

In some embodiments, the at least one female connector and the at least one male connector comprise LC connectors.

In some embodiments, the at least one female connector and the at least one male connector are mounted in linearly opposite directions.

In some embodiments, each of the at least one female connector and the at least one male connector comprise two LC connectors mounted in linearly opposite directions.

In some embodiments, each of the at least one female connector comprises four LC connectors and each of the at least one male connector comprises two LC connectors mounted in a linear opposite direction from the female connectors.

In some embodiments, the housing is sized to house a miniature optical component.

Another aspect of the invention provides optical component package comprising: an optical component; a housing having an interior and an exterior, the interior housing the optical component; at least one fiber optic female connector comprising a pluggable female socket, mounted in the housing with the pluggable female socket on the exterior and being connected to the optical component on the interior; at least one fiber optic male connector comprising a pluggable male element, mounted in the housing with the pluggable male element on the exterior and being connected to the optical component on the interior.

In some embodiments, the at least one fiber optic female connector and the at least one fiber optic male connector are fixed to the housing such that at least one of the at least one fiber optic female connector and the at least one fiber optic male connector support the package when the package is plugged in.

In some embodiments, the at least one fiber optic female connector and the at least one fiber optic male connector are fixed to the housing by an adhesive.

In some embodiments, the at least one fiber optic female connector and the at least one fiber optic male connector are fixed to the housing by the shape of the housing.

In some embodiments, pluggable female socket and the pluggable male element are mounted in linearly opposite directions.

In some embodiments, the at least one fiber optic female connector and the at least one fiber optic male connector comprise the same type of connector.

In some embodiments, the at least one fiber optic female connector and the at least one fiber optic male connector comprise LC connectors.

In some embodiments, the package is used to process an optical signal.

A further aspect of the invention provides a method of routing an optical signal comprising: receiving a signal directly to a pluggable input connector of an optical component package; processing the signal within the optical component package; transmitting the signal directly from a pluggable output connector of the optical component package.

BRIEF DESCRIPTION OF THE DRAWINGS

Embodiments of the invention will now be described with reference to the attached drawings in which.

DETAILED DESCRIPTION OF THE EMBODIMENTS

Figure 1:
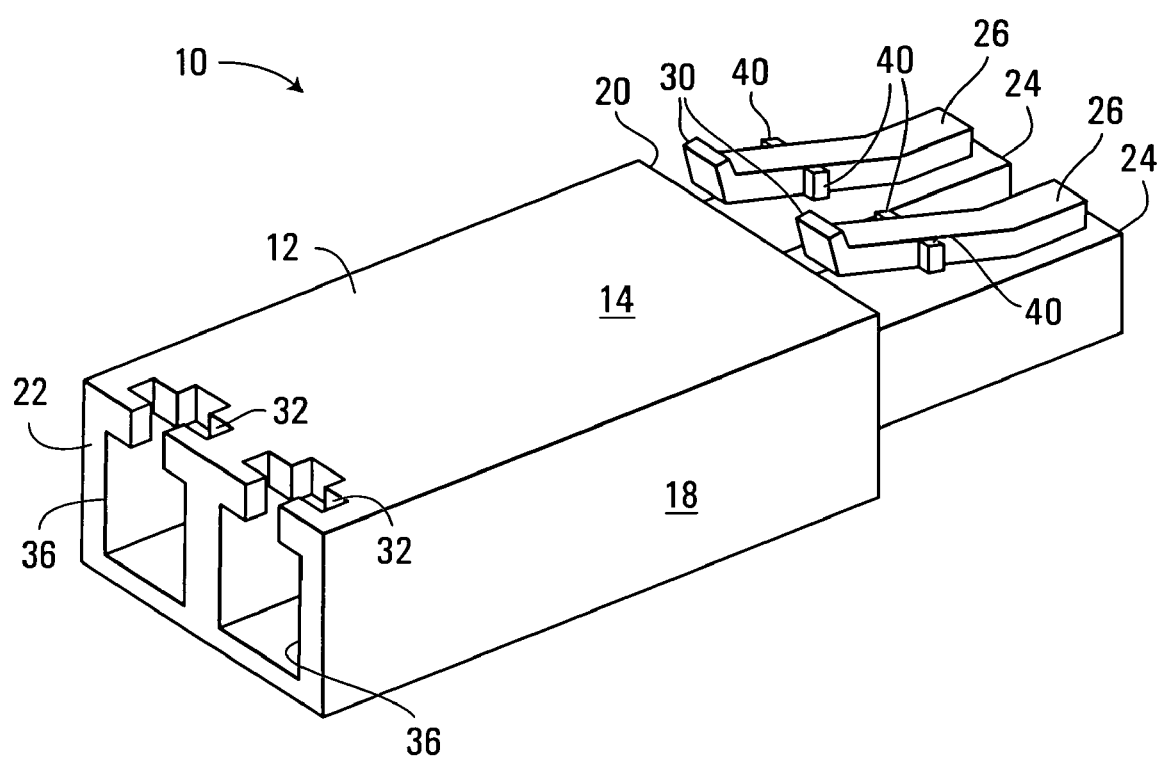
FIG. 1 is a perspective view of a package according to a first embodiment of the invention.
Figure 2:
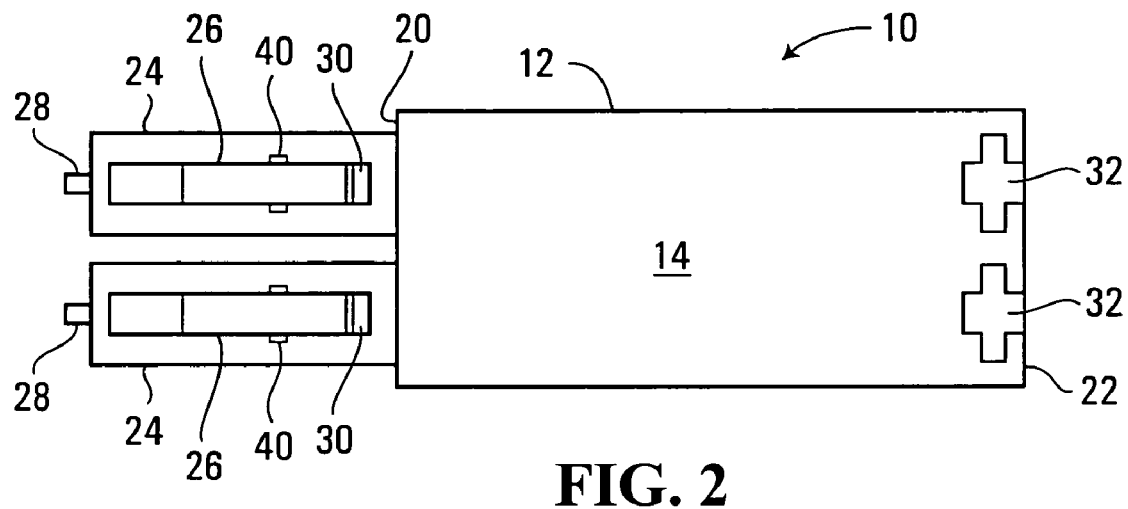
FIG. 2 is a top view of the embodiment of FIG. 1.
Figure 3:
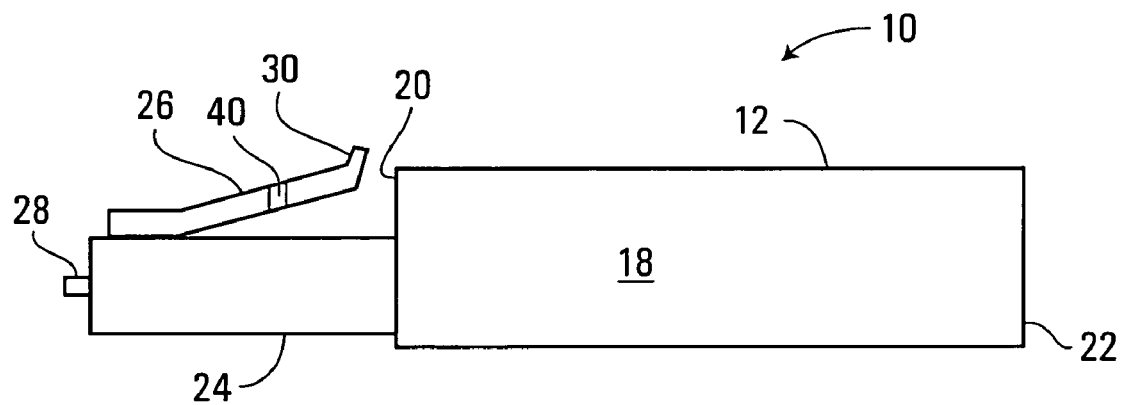
FIG. 3 is a side view of the embodiment of FIG. 1.
Figure 4:
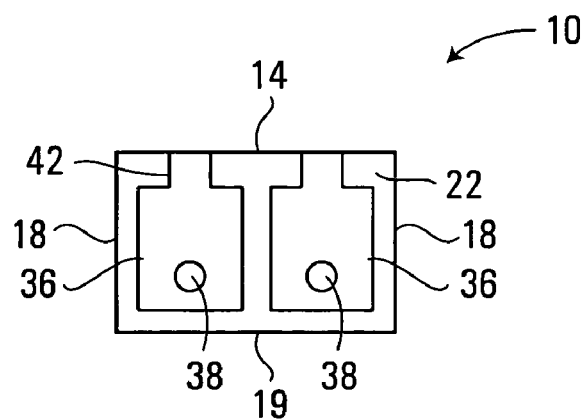
FIG. 4 is a socket end view of the embodiment of FIG. 1.

FIGS. 1 through 4 depict a first embodiment of an optical package 10 for an optical component. The optical package 10 comprises a housing 12 into which an optical component may be mounted.

The housing 12 comprises a top 14, a bottom 19, and sides 18. The optical package also comprises a front end 20 and a rear end 22. The designations "top", "bottom", "side", "front" and "rear" are utilised to facilitate the description of the optical package 10 and do not denote any required orientation of the optical package 10 in use.

In the embodiment of FIGS. 1 to 4, two male fiber optic connectors comprising male connector elements 24 protrude from the front end 20 of the housing 12 and two female fiber optic connectors comprising female sockets 36 are provided at the rear end 22 of the housing 12.

Each of the male connector elements 24 have a latch 26 fastened to its top side. Each latch 26 includes latch arms 40 projecting outwardly sideways at an intermediate position. Each latch 26 also incorporates top protrusions 30 at a rear end to facilitate removal of the male connector element 24 from a socket of the form of the female socket 36 described in further detail below.

Fiber extensions 28 (FIGS. 2 and 3) are provided on each of the male connector elements 24. The fiber extensions 28 project frontward and are adapted to mate with a female socket of the form of the female socket 36.

A rear end of each of the male connector element 24 is held within the housing 12. This may be accomplished in various ways. For example, the housing 12, in particular the front end 20, may be shaped to hold the male connector in place. The male connector may also be glued in place by an adhesive. Other means of fixing the male connector to the housing 12 may also be used.

Each of the two female sockets 36 includes a fiber receiving hole 38 (FIG. 4) for receiving a fiber extension of the form of the fiber extensions 28 of the male connector elements 24.

The female sockets 36 also include a latch channel 42 sized to receive a latch of the form of the latch 26. The sockets 36 also incorporate latch receiving holes 32 for receiving latch arms of the form of the latch arms 40.

In the embodiments shown in FIGS. 1 to 4, the female sockets 36 are Local Connector (LC) sockets which are adapted to receive LC connector elements of the form of the male connector elements 24. The following explanation of the interaction of a male LC connector and a female LC connector of the form shown in the drawings utilises the reference characters from the drawings for ease of explanation. It will be understood that the male LC connectors of a package cannot plug into the female LC connectors of the same package. The male LC connectors of a package can be plugged into, for example, the female LC connectors of a separate package or module.

The latch 26 on the male connector elements 24 is biased in an outward direction when the male connector elements 24 are inserted in the female socket of the form of the female sockets 36. The outwardly angled portion of the latch 26 is bent downward until the latch arms 40 pass beneath the latch arm receiving holes of the form of the latch arm receiving holes 32 at which point the latch 26 flexes outward so that the latch arms of the form of latch arms 40 engage the latch arm receiving holes 32 to retain the male connector element 24 in the female socket of the form of the female socket 36. To disengage the male connector element 24 from the female socket of the form of the female socket 36, the latch 26 is forced downward such as by the aide of the protrusions 30 so that the latch arms of the form of latch arms 40 disengage from the latch arm receiving holes 32 and the male connector element 24 can be pulled from the female socket of the form of the female socket 36. Other suitable latching mechanisms may alternatively be provided.

Both the male connectors and the female connectors are pluggable meaning that they can be plugged in and unplugged mechanically and do not require solder, adhesive or other material to maintain a connection.

Although the embodiment disclosed utilises both male and female connectors, the type, location and number of connectors may be varied depending on the component or components within the package without deviating from the scope of the invention.

The spacing of the female sockets 36 is advantageously the same as the spacing and relative positioning of the male connector elements 24 such that the optical package 10 according to FIGS. 1 to 4 may be plugged into a second optical package of the same design. It will also be appreciated that the orientation of the sockets 36 relative to the male connector elements 24 in FIGS. 1 to 4 allows successive optical packages 10 to be connected in the same orientation in a linear fashion. This is not essential. The sockets 36 need not be on an opposite side of the housing 12 from the male connector elements 24 and may alternatively be on an adjacent or the same face. Both the male connector elements 24 and the female sockets 36, when they are multiple, need not be on the same face as each other.

As with the male connectors, the female connectors which incorporate the female sockets 36 may be affixed to the optical package 10 in various manners including the shape of the housing 12 retaining the connectors in place as well as attachment by an adhesive.

The housing 12 is depicted in FIGS. 1 to 4 as rectangular in shape. However, this shape is not required. The housing may be of any shape which accommodates the desired internal optical device and the fiber optic connectors. The material of the housing 12 may also be any material suitable for optical packaging such as metal, plastics, etc.

The interior of the package contains one or more optical components functionally connected to the male connector elements 24 and the female sockets 36. The optical component is placed within the package and connected to the male connector element 24 and the female socket 36. Connection can be made without the use of pigtails, i.e., optical cables external to the package.

Figure 5:
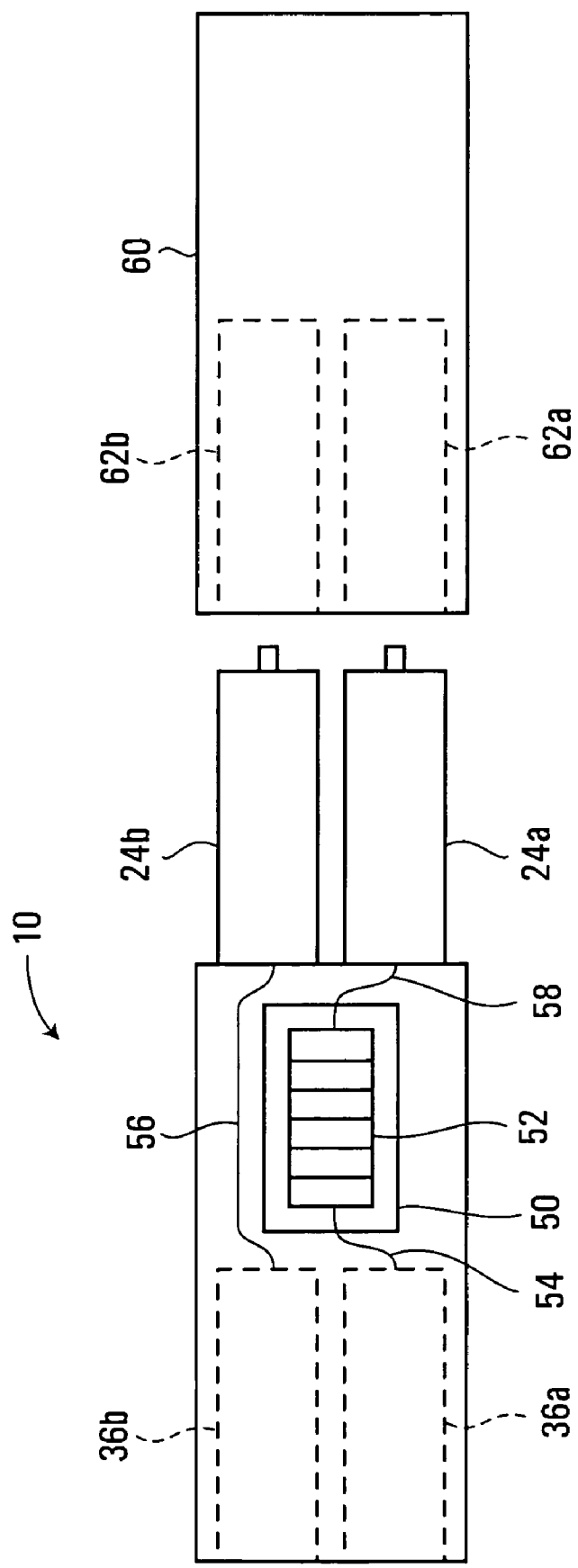
FIG. 5 is a schematic diagram showing the interior of the embodiment of FIG. 1 and a SFP (Small Form-factor Pluggable) package.

One example of an optical component which may be used with this package is miniaturised optical filter. FIG. 5 is a schematic diagram showing the interior of the optical package 10. An optical bench 50 is secured within the housing 12. The optical bench may be based on, for example, a circuit board. The optical bench may perform different signal conditioning such as multiplexing/demultiplexing, dispersion compensation (DC), amplification, or filtering depending on the components mounted on the optical bench 50. In FIG. 5, a fiber Bragg grating 52 is mounted. The fiber Bragg grating 52 can be used as a filter.

Light guiding mechanisms 54, 56 and 58 are also internal to the housing 12. The light guiding mechanisms 54, 56 and 58 may comprise optical batch cord, optical fiber, lenses or other components which serve to guide the optical signal. An input socket 36a of the female sockets 36 is coupled to the fiber Bragg grating 52 by the light guiding mechanism 54. The output of the fiber Bragg grating 52 is coupled to an output connector element 24a of the male connector elements 24 by the light guiding mechanism 58. An input connector element 24b is connected to an output socket 36b by the light guiding mechanism 56.

The optical connectors described herein are LC type connectors. Other types of optical connectors may alternatively be used having different shapes, interconnection and fastening means.

Advantageously, the spacing and orientation of the LC type connectors in FIGS. 1 through 5 are positioned to allow the optical package 10 to be plugged into a standard SFP (small form factor pluggable) transceiver. Such an SFP transceiver 60 is shown schematically in FIG. 5. The SFP transceiver 60 has a receiver socket 62a and transmitter socket 62b. As can be seen in FIG. 5, the optical package 10 can be aligned to plug the input and output connectors 24a and 24b into the receiver and transmitter sockets 62a and 62b.

Figure 6:
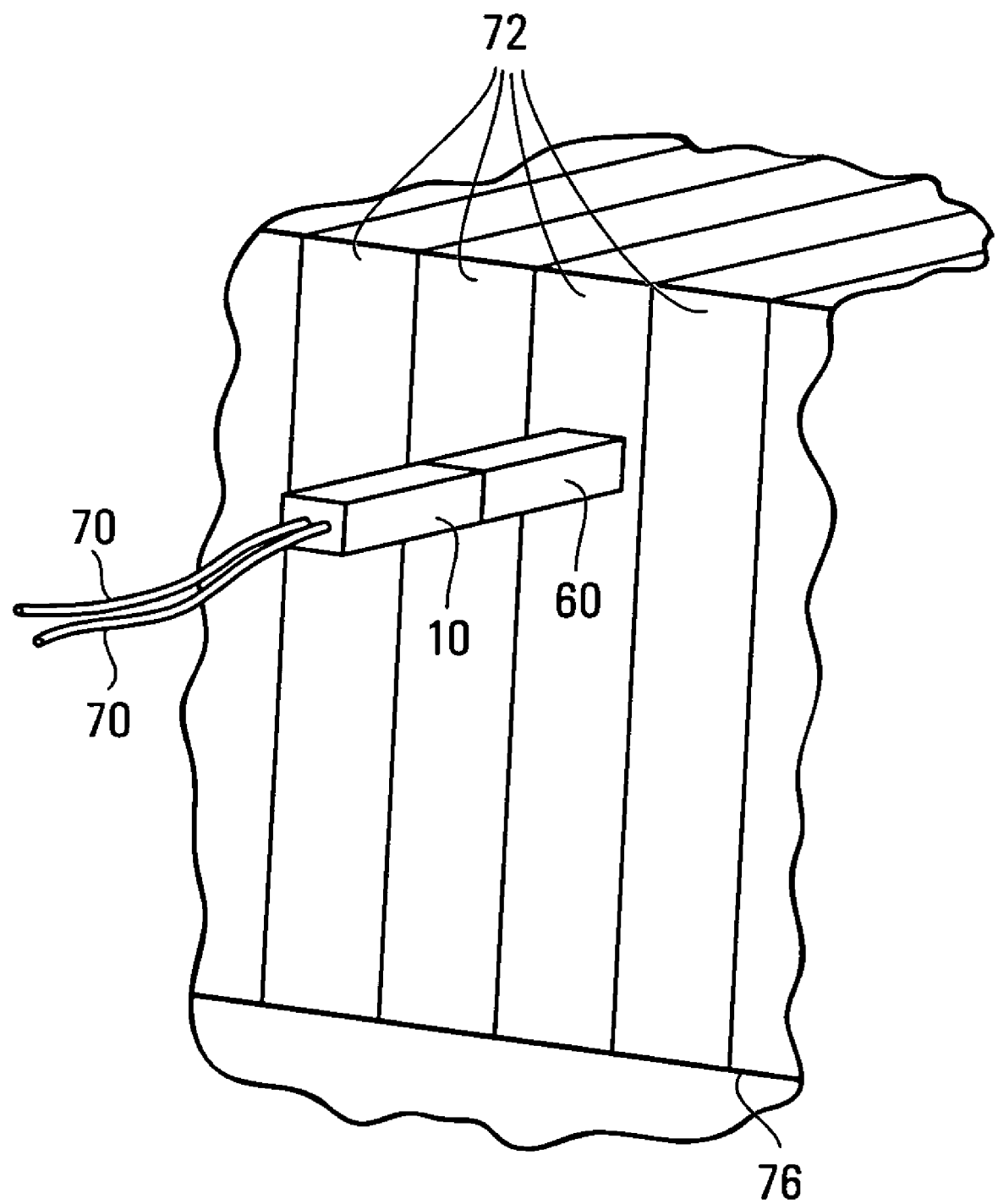
FIG. 6 is a schematic perspective view of the package of FIG. 1 assembled with a SFP package and a module.

FIG. 6 shows the optical package 10 in use. In particular, FIG. 6 depicts a partial perspective schematic view of a portion of a module card rack 76. A plurality of modules 72 are installed in the module card rack 72. In the embodiment of FIG. 6, the optical component (not shown) within the optical package 10 comprises an optical filter. One of the modules 72 has the SFP transceiver 60 connected through the front face of the module. The SFP transceiver 60 has solderable pins on the end connected to the module and female LC connectors on its outward end such that the package 10 may be plugged into the SFP transceiver 60 in an in-line fashion as seen in FIGS. 5 and 6. Input and output cables 70 can then be plugged into the female sockets 36.

The optical package 10 is self-supporting in that the male connector element 24 will hold the package without need of any external support when plugged in. Similarly, if the female socket 36 is plugged into a rigid male connector element, the socket 36 will hold the package.

Figure 7:
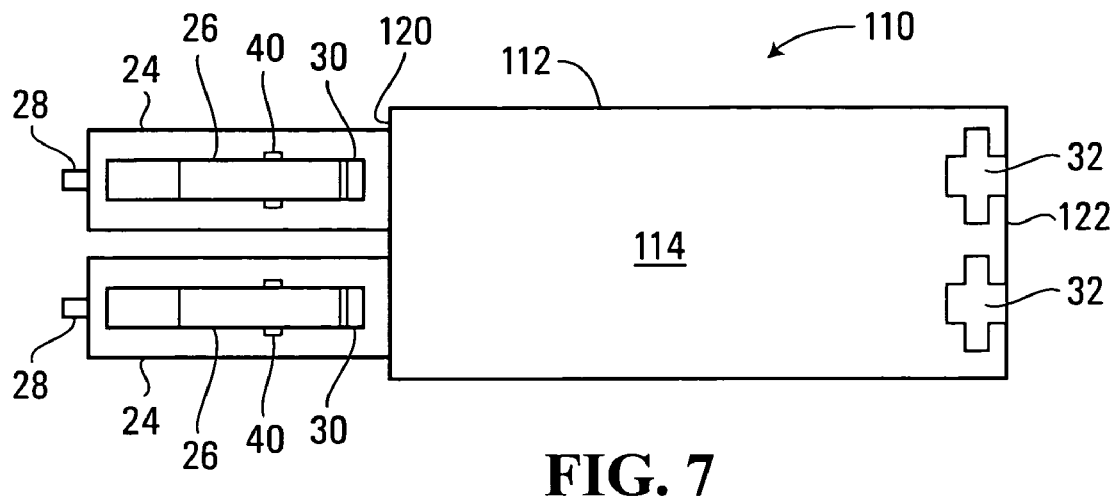
FIG. 7 is a top view of a second embodiment of the invention.
Figure 8:
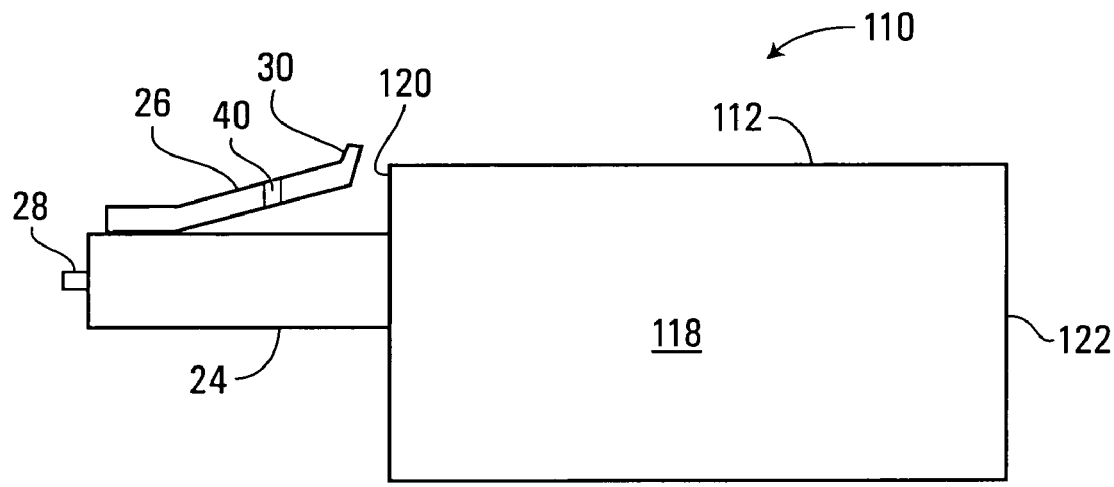
FIG. 8 is a side view of the embodiment of FIG. 7.
Figure 9:
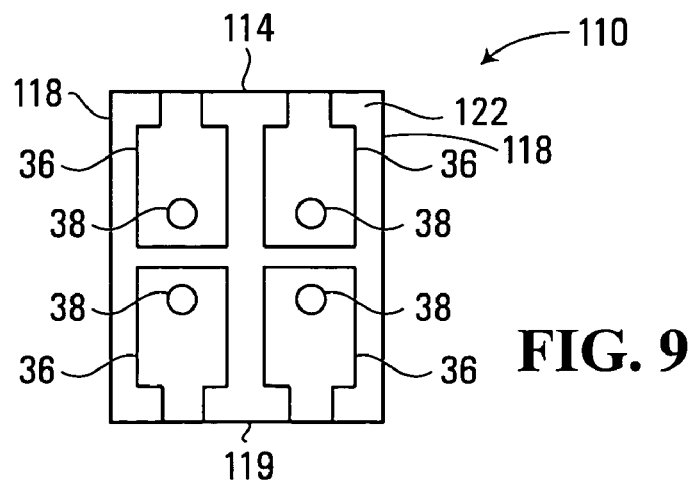
FIG. 9 is a socket end view of the embodiment of FIG. 7.

A second embodiment of the invention is depicted in FIGS. 7 to 9. FIGS. 7 to 9 will be described only in respect of the differences from the embodiment of FIGS. 1 to 6. FIGS. 7 to 9 depict an optical package 110 having a housing 112 comprised of a top 114, a bottom 119, sides 118, a front end 120 and a rear end 122 comparable to the same elements of the optical package 10. The sides 118 of the housing 122 are of a larger dimension than the sides 18 of the optical package 10. This is to accommodate an additional two female sockets 36 on the rear end 122 of the housing 112. The extra two female sockets 36 allow additional connections to be made to the optical component within the optical package 10.

Figure 10:
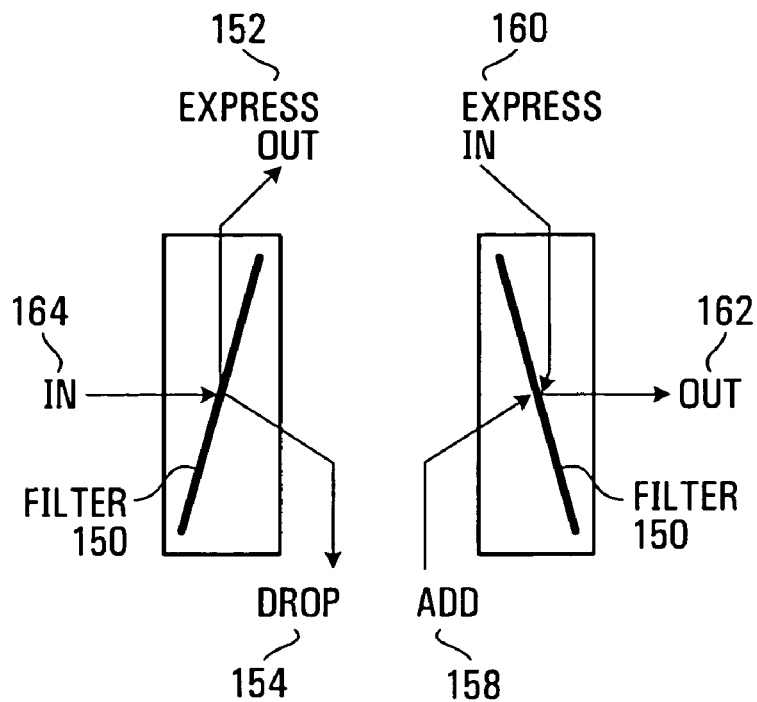
FIG. 10 is a schematic diagram showing connections for the embodiment of FIG. 7.

FIG. 10 shows a schematic representation of a use which may be made of the embodiment of FIGS. 7 to 9. Two filters 150 are mounted within the housing 112. The male connectors are connected to the IN 164 and the OUT 162. Two female sockets are connected to the EXPRESS IN 160 and the EXPRESS OUT 152. The other two female sockets are connected to the DROP 154 and the ADD 158. This allows access to an intermediate stage of the filtering through the EXPRESS IN 160 and EXPRESS OUT 152 which can be useful for network control applications.

Figure 11A:
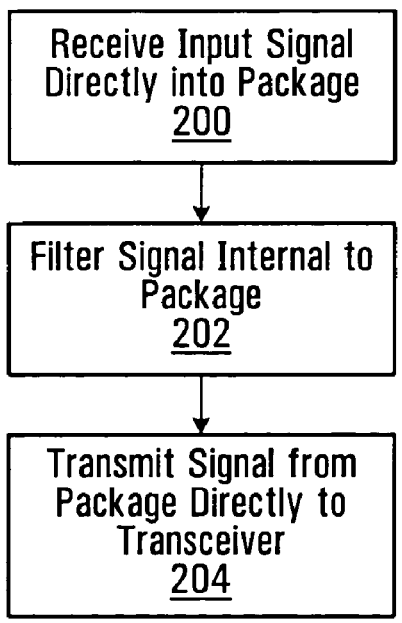
FIGS. 11A and 11B are flow diagrams of signal processing through the embodiment of FIG. 1.
Figure 11B:
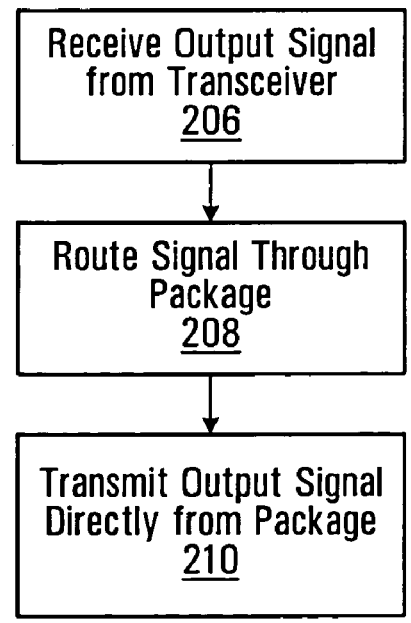

FIGS. 11a and 11b are flow diagrams of a method of using the optical package 10 with an optical filter mounted therein as shown in FIG. 5. FIG. 11a shows the processing of an input signal utilising the optical package 10. In step 200, a signal is received directly to the optical package 10. In step 202, the signal is filtered internally to the optical package 10. In step 204, the signal is transmitted from the optical package 10 directly to, for example, a SFP transceiver.

FIG. 11b shows the reversed processing of the signal. In particular, in step 206 an output signal is received directly from a transceiver into the optical package 10. The signal is routed through the optical package 10 in step 208. In step 210, the output signal is transmitted directly from the package 10.

Of course, with other components mounted within the optical package 10, other processing steps would occur within the optical package 10 and the origin and the destination of the input and output signals would be different. As well, with multiple inputs/outputs the functions which may occur internal to the optical package 10 could be further enhanced.

The package is particularly applicable for use with miniaturised optical components. The small size of optical package 10 relative to a module, allows the optical package 10 to be plugged into a socket in the face of a module and extend out therefrom in a self supporting manner. This frees up a module slot, eliminates interconnecting cables and allows for easy replacement.

The above description of embodiments should not be interpreted in any limiting manner since variations and refinements can be made without departing from the scope of the application.

The invention claimed is:

1. An optical component package comprising:
   a housing having an interior and an exterior, the interior being adapted to house an optical component;
   at least two fiber optic connectors, each comprising a component side adapted to connect to the optical component and each having a pluggable exterior element;
   each of the at least two fiber optic connectors being mounted to the housing with the respective component side accessible from the interior of die package and the respective pluggable exterior element accessible from the exterior;
   wherein the at least two optical connectors comprise at least two pairs of optical connectors and wherein the two pairs of optical connectors are mounted in linearly aligned opposite directions.

2. The optical component package according to claim 1 wherein the at least two optical connectors are fixed to the housing such that the connectors sup port the package when the package is plugged in.

3. The optical component package according to claim 2 wherein the at least two optical connectors are fixed to the housing by an adhesive.

4. The optical component package according to claim 2 wherein the at least two optical connectors are fixed to the housing by the shape of the housing.

5. The optical component package according to claim 1 wherein the at least two optical connectors comprise at least one female connector and at least one male connector.

6. The optical component package according to claim 5 wherein the at least one female connector and the at least one male connector comprise the same type of connector.

7. The optical component package according to claim 6 wherein the at least one female connector and the at least one male connector comprise LC connectors.

8. the optical component package according to claim 5 wherein each of the at least one female connector comprises four LC connectors and each of the at least one male connector comprises two LC connectors mounted in a linear opposite direction from two of the female connectors.

9. The optical component package according to claim 1 wherein the housing is sized to house a miniature optical component.

10. An optical component package comprising:
    an optical component;
    a housing having an interior and an exterior, the interior housing the optical component;
    at least one fiber optic female connector comprising a pluggable female socket, mounted in the housing with the pluggable female socket on the exterior and being connected to the optical component on the interior;
    at least one fiber optic male connector comprising a pluggable male element, mounted in the housing with the pluggable male element on the exterior and being connected to the optical component on the interior;
    wherein the pluggable female socket comprises a pair of pluggable female sockets and the pluggable male element comprises a pair of pluggable male elements and wherein the pair of pluggable female sockets are mounted in a linearly aligned opposite direction from the pair of pluggable male elements.

11. The optical component package according to claim 10 wherein the at least one fiber optic female connector and the at least one fiber optic male connector are fixed to the housing such that at least one of the at least one fiber optic female connector and the at least one fiber optic male connector support the package when the package is plugged in.

12. The optical. component package according to claim 10 wherein the at least one fiber optic female connector and the at least one fiber optic. male connector are fixed to the housing by an adhesive.

13. The optical component package according to claim 10 wherein the at least one fiber optic female connector and the at least one fiber optic male connector are fixed to the housing by the shape of the housing.

14. The optical component package according to claim 10 wherein the at least one fiber optic female connector and the at least one fiber optic male connector comprise the same type of connector.

15. The optical component package according to claim 10 wherein the at least one fiber optic female connector and the at least one fiber optic male connector comprise LC connectors.

16. A use of a package according to claim 1 to process an optical signal.

* * * * *